United States Patent
Li et al.

(10) Patent No.: US 11,390,432 B2
(45) Date of Patent: Jul. 19, 2022

(54) COAXIAL ROTARY LID AND DRINKING CUP THEREOF

(71) Applicant: Ningbo Lisi Houseware Co., Ltd., Ningbo (CN)

(72) Inventors: Lixin Li, Ningbo (CN); Yongning Zhou, Ningbo (CN)

(73) Assignee: Ningbo Lisi Houseware Co., Ltd., Ningbo (CN)

( * ) Notice: Subject to any disclaimer, the term of this patent is extended or adjusted under 35 U.S.C. 154(b) by 0 days.

(21) Appl. No.: 16/766,499

(22) PCT Filed: Jul. 1, 2019

(86) PCT No.: PCT/CN2019/094165
§ 371 (c)(1),
(2) Date: May 22, 2020

(87) PCT Pub. No.: WO2020/252814
PCT Pub. Date: Dec. 24, 2020

(65) Prior Publication Data
US 2022/0002036 A1   Jan. 6, 2022

(30) Foreign Application Priority Data

Jun. 21, 2019  (CN) .......................... 201910541094.6

(51) Int. Cl.
*B65D 47/06*   (2006.01)
*A45F 3/18*    (2006.01)
(Continued)

(52) U.S. Cl.
CPC .............. *B65D 47/065* (2013.01); *A45F 3/18* (2013.01); *A47G 19/2272* (2013.01);
(Continued)

(58) Field of Classification Search
CPC ...... B65D 77/283; B65D 44/06; B65D 77/28; B65D 2543/00046; B65D 2517/0049;
(Continued)

(56) References Cited

U.S. PATENT DOCUMENTS 8,056,745 B2 * 11/2011 Yu .......................... A47J 41/0027
                                                            220/254.3
8,550,269 B2 * 10/2013 Lane .................. B65D 47/0885
                                                            215/229

(Continued)

*Primary Examiner* — Anthony D Stashick
*Assistant Examiner* — Prince Pal
(74) *Attorney, Agent, or Firm* — Wang Law Firm, Inc.

(57) ABSTRACT

The present invention disclosed a rotary lid for a water container, comprises a lid body (1), a rotary handle (2), and a suction nozzle (3), when the rotary handle (2) and the suction nozzle (3) are rested on the lid body, the sucking water inlet (30) is not in communication with the connecting water inlet (10) on the lid body (1); and when the suction nozzle (3) rotates up by the rotary handle (2), the sucking water inlet (30) on the suction nozzle (3) is in communication with the connecting water inlet (10) on the lid body (1). The present invention further disclosed a drinking cup thereof. When the rotary handle is rotated up with only one hand, the sucking water inlet can be communicated with the connecting water inlet, then the sucking water inlet is opened, so that it is convenient for drinking; and, when the rotary handle is rotated down, the suction nozzle rotates together, then the sucking water inlet is not communicated with the connecting water inlet, so that the sucking water inlet is closed.

10 Claims, 9 Drawing Sheets

(51) Int. Cl.
*A47G 19/22* (2006.01)
*B65D 47/32* (2006.01)
*B65D 51/24* (2006.01)
*B65D 53/02* (2006.01)
*F16C 11/04* (2006.01)

(52) U.S. Cl.
CPC ........... *B65D 47/32* (2013.01); *B65D 51/243* (2013.01); *B65D 53/02* (2013.01); *F16C 11/04* (2013.01)

(58) Field of Classification Search
CPC .... B65D 2251/1016; B65D 2251/1058; B65D 51/242; B65D 25/32; B65D 25/28; A47G 19/2272; A47G 19/2266; A47G 19/22; A47G 21/18
USPC ..... 215/229, 388, 387, 212.5; 220/709, 705, 220/717, 703, 707, 708, 710.5
See application file for complete search history.

(56) References Cited

U.S. PATENT DOCUMENTS

| | | | | |
|---|---|---|---|---|
| 8,668,106 | B1* | 3/2014 | Joy | A47G 19/2272 |
| | | | | 220/717 |
| 8,689,989 | B2* | 4/2014 | Lane | A45F 3/16 |
| | | | | 220/264 |
| 9,392,892 | B2* | 7/2016 | Wong | A47G 19/2272 |
| 9,573,738 | B1* | 2/2017 | Lai | B65D 47/305 |
| 9,650,189 | B1* | 5/2017 | Lawson | B65D 47/12 |
| 10,117,533 | B2* | 11/2018 | Chen | B65D 47/32 |
| 10,159,368 | B2* | 12/2018 | Lin | A47G 19/2266 |
| D853,181 | S* | 7/2019 | Stanton | D7/392.1 |
| 10,549,289 | B2* | 2/2020 | Romanov | B05B 11/0029 |
| 10,683,146 | B2* | 6/2020 | Farsai | B65D 47/2018 |
| 11,267,623 | B2* | 3/2022 | Karlik | B65D 47/2043 |
| 11,345,524 | * | 5/2022 | Ni | B65D 43/0231 |
| 2011/0284538 | A1* | 11/2011 | Valderrama | A47G 19/2272 |
| | | | | 220/212.5 |
| 2012/0031902 | A1* | 2/2012 | Gilbert | B65D 39/08 |
| | | | | 220/212.5 |
| 2012/0125931 | A1* | 5/2012 | Roth | B65D 43/0231 |
| | | | | 220/254.3 |
| 2012/0145713 | A1* | 6/2012 | Jung | B65D 47/0885 |
| | | | | 220/254.3 |
| 2012/0325815 | A1* | 12/2012 | Gilbert | A47G 19/2272 |
| | | | | 220/264 |
| 2013/0140309 | A1* | 6/2013 | George | B65D 43/26 |
| | | | | 220/254.1 |
| 2014/0061248 | A1* | 3/2014 | Hoskins | A47G 19/2266 |
| | | | | 222/215 |
| 2015/0173539 | A1* | 6/2015 | Mason | B65D 77/283 |
| | | | | 220/715 |
| 2016/0000245 | A1* | 1/2016 | Sims | B65D 47/0871 |
| | | | | 220/253 |
| 2016/0106241 | A1* | 4/2016 | Wong | B65D 47/32 |
| | | | | 220/254.5 |
| 2017/0225850 | A1* | 8/2017 | Sorensen | B65D 25/56 |
| 2017/0253395 | A1* | 9/2017 | Matthis | A45F 3/16 |
| 2018/0244441 | A1* | 8/2018 | Wodka | A47G 19/2272 |
| 2018/0265266 | A1* | 9/2018 | McNamara | B65D 47/06 |
| 2019/0072423 | A1* | 3/2019 | Poon | A47G 23/16 |
| 2019/0075950 | A1* | 3/2019 | Xu | A47G 19/2227 |
| 2020/0095031 | A1* | 3/2020 | Cheng | B65D 23/102 |
| 2020/0138212 | A1* | 5/2020 | Nishijima | A47G 21/188 |
| 2020/0148431 | A1* | 5/2020 | Tsai | B65D 47/0871 |
| 2020/0367677 | A1* | 11/2020 | Silsby | A47G 19/2272 |
| 2020/0391909 | A1* | 12/2020 | Pinelli | B65D 55/10 |
| 2021/0039846 | A1* | 2/2021 | Jinkins | B65D 47/0885 |
| 2021/0331842 | A1* | 10/2021 | Wong | B65D 47/0861 |
| 2021/0403207 | A1* | 12/2021 | Li | B65D 43/0229 |
| 2022/0135294 | A1* | 5/2022 | Peng | B65D 51/18 |
| | | | | 220/203.01 |

* cited by examiner

COAXIAL ROTARY LID AND DRINKING CUP THEREOF

CROSS-REFERENCE TO RELATED APPLICATIONS

This application is a national phase entrance of and claims benefit to PCT Application for a coaxial rotary lid and drinking cup thereof and an application thereof, PCT/CN2019/094165, filed on Jul. 1, 2019, which claims benefit to Chinese Patent Applications 201910541094.6, filed on Jun. 21, 2019. The specifications of both applications are incorporated herein by this reference.

TECHNICAL FIELD OF THE INVENTION

The present invention relates to the technical field of drinking cups, and in particular to a coaxial rotary lid and a drinking cup thereof.

BACKGROUND OF THE INVENTION

Users usually use drinking cups to contain beverages, mineral water or the like for drinking when they are thirsty. Existing drinking cups mainly include a cup body and a lid fitted with the cup body. The lid generally includes a lid body, a water outlet formed on the lid body and a seal plug capable of sealing the water outlet. The water outlet is often higher than the lid body by a certain distance. When a user wants to have a drink, the user holds the cup body with one hand, and opens or removes the seal plug on the lid with the other hand to expose the water outlet (also referred to as a drinking hole). In this way, the user drinks the water contained in the cup body through the water outlet. When the user does not want to have a drink, the user holds the cup body with one hand and seals the water outlet on the lid by the seal plug with the other hand, ensuring no leakage of water from the cup body.

Such existing lid structures have some problems. When a user wants to have a drink, it is difficult for the user to remove the seal plug on the lid with only one hand. Consequently, the user is unable to open the water outlet to drink water. It is also difficult for the user to seal, with only one hand, the water outlet on the lid by the seal plug. In other words, with the existing lid structures, a user can drink the beverage contained in the cup body only when the user operates the drinking cup with both hands. It fails to satisfy the user's actual needs of opening or closing the water outlet on the lid with only one hand.

SUMMARY OF THE INVENTION

A first technical problem to be solved by the present invention is to provide a rotary lid for a water container. After the rotary lid is fastened to a water container, it is convenient for a user to open or close a sucking water inlet on a suction nozzle by flipping up or down a rotary handle with only one hand.

A second technical problem to be solved by the present invention is to provide a drinking cup with the rotary lid.

To solve the first technical problem, the rotary lid for a water container comprises a lid body having a connecting water inlet and a shaft hole, a rotary handle rotatably connected to the lid body, and a suction nozzle rotatably connected to the rotary handle;

wherein, the rotary handle has a handle body and a rotating shaft with an end protruding from an inner wall of the handle body, the rotating shaft is inserted inside the shaft hole on the lid body, the rotary handle is disposed on the lid body rotating around the rotating shaft, and the rotating shaft has a first notch located at an end of the rotating shaft;

the suction nozzle has a sucking water inlet, a water passage, a drinking hole and a limiting slot matching with the end of the rotating shaft, the water passage is in communication with the sucking water inlet and the drinking hole, the limiting slot is located adjacent to the sucking water inlet and the end of the rotating shaft is inserted inside the limiting slot with the first notch resting against the limiting slot, such that rotation of the suction nozzle is driven and limited by the rotary handle;

when the rotary handle and the suction nozzle are rested on the lid body, the sucking water inlet is not in communication with the connecting water inlet on the lid body, and when the suction nozzle rotates up by the rotary handle, the sucking water inlet on the suction nozzle is in communication with the connecting water inlet on the lid body.

Preferably, the rotary lid further comprises a rotatable nozzle flip for covering the suction nozzle; wherein the rotating shaft has a second notch located at the end of the rotating shaft, and the nozzle flip has a flip body and a lug extending from the flip body, the lug has a hole for receiving the second notch; the end of the rotating shaft locates inside the rotating hole of the nozzle flip with the second notch resting against and the rotating hole, such that rotation of the nozzle flip is driven and limited by the rotary handle.

Preferably, in the rotary lid, the rotating shaft has a first through hole, the suction nozzle has a second through hole located inside the limiting slot, and a pin runs through the first through hole, the rotating hole and the second through hole, such that, the rotary handle, the nozzle flip and the suction nozzle rotate around the pin.

Preferably, in the rotary lid, the nozzle flip has a clamping portion extending downward from the flip body; a toggle mechanism is movably assembled on the lid body at the front of the drinking hole on the suction nozzle, having a toggle stick protruding at a front surface of the toggle mechanism which when pushed causes the toggle mechanism to move relative to the lid body; the lid body has a toggle hole, the toggle stick extents from the inside of the lid body to the outside of the lid body through the toggle hole; and, the toggle mechanism engages the clamping portion when the toggle stick is pushed.

Preferably, in the rotary lid, the lid body has a connecting wall protruding from a top edge of the lid body around the connecting water inlet, and the shaft hole is formed on the connecting wall.

Preferably, the lid body has a plurality of positioning recesses formed on the connecting wall, and the rotary handle has a plurality of positioning points on the rotating shaft, each positioning point is located in the corresponding positioning recess.

Preferably, in the rotary lid, a seal component for fitting with the connecting water inlet is provided on the upper end face of the lid body, an opening for communicating the connecting water inlet is formed on the seal component, and the seal component is located between the suction nozzle and the connecting water inlet.

Preferably, in the rotary lid, the radian of the second notches is greater than that of the first notches; or, an air inlet is formed on the lid body; or, a leak-proof seal ring is formed on an inner side of the lid body.

To solve the second technical problem, the drinking cup with the rotary lid, comprises a cup body and the rotary lid, wherein the lid body of the coaxial rotary lid is screwed on the cup body.

Preferably the drinking cup further comprises a drinking pipe with two ends, one end of the drinking pipe is connected to the connecting water inlet on the lid body, and the other end of the drinking pipe is located inside the cup body.

Compared with the prior art, the present invention has the following advantages.

Firstly, the rotary lid of the present invention at least has a lid body, a rotary handle and a suction nozzle. The lid body has a connecting water inlet and shaft hole, and rotating shaft, which can run in the shaft hole and rotate therein, are arranged on the rotary handle. Thus, the rotary handle can be rotatably connected to the lid body. The suction nozzle has a sucking water inlet, a water passage and a drinking hole, and the suction nozzle is rotatably connected to the rotary handle. In this way, when a user flips up the rotary handle with only one hand, the sucking water inlet on the suction nozzle can be communicated with the connecting water inlet on the lid body, then the sucking water inlet on the suction nozzle is opened, so that it is convenient for drinking; and, when the user flips down the rotary handle with only one handle, the suction nozzle rotates together with the rotary handle, then the sucking water inlet on the suction nozzle is not communicated with the connecting water inlet on the lid body, so that the sucking water inlet on the suction nozzle is closed.

Secondly, in the rotary lid of the present invention, a nozzle flip can be additionally provided. The nozzle flip is rotatably connected to the rotary handle, and a pin shaft runs through the rotary handle, the suction nozzle and the nozzle flip to realize the coaxial rotation of the rotary handle, the suction nozzle and the nozzle flip. That is, by flipping up only the rotary handle, the suction nozzle and the nozzle flip can rotate therewith, realizing the coaxial linkage of the rotary handle, the suction nozzle and the nozzle flip during rotation.

Finally, in the rotary lid of the present invention, a clamping portion can be further formed on the nozzle flip. A toggle stick extents from the inside of the lid body to the outside of the lid body through the toggle hole is mounted in the toggle hole on the lid body, and the toggle mechanism engages the clamping portion when the toggle stick is pushed. With such an arrangement, simply by stirring the toggle stick with only one hand, the toggle mechanism can be move away from the clamping portion. Thus, it is convenient for the user to further rotate the rotary handle so as to open or close the sucking water inlet on the suction nozzle.

DETAILED DESCRIPTION OF THE EMBODIMENTS

To enable a further understanding of the present application content of the application herein, refer to the detailed description of the application and the accompanying drawings below:

FIGS. 1-13 show a preferred embodiment of the rotary lid of the present invention. The rotary lid comprises a lid body 1, a rotary handle 2 and a suction nozzle 3.

The lid body 1 has a connecting water inlet 10 and two shaft holes 11 arranged on the lid body 1. Here, the word "arranged" means that the shaft holes 11 can be directly formed on the lid body 1, or, the shaft holes 11 can be formed on a separate component which is disposed on the lid body 1.

The rotary handle 2 has a handle body 20 and two rotating shafts 21 with an end respectively protruding from an inner wall of the handle body 20, each rotating shaft 21 is inserted inside the shaft hole 11 on the lid body 1, the rotary handle 2 is disposed on the lid body 1 rotating around the rotating shaft 21; and each rotating shaft 21 has a first notch 211 located at an end of the rotating shaft 21.

Here, the rotary handle 2 refers to a structure onto which a user can apply an external force, belonging to a structure for receiving an external force in the whole lid. For example, the rotary handle 2 may be designed as the structure shown in FIG. 3. Of course, the rotary handle 2 may also be designed as a single-rod structure. In addition, "rotating shaft 21 protruding from an inner wall of the handle body 20" means that the rotating shafts 21 may be directly formed on the handle body 20, or, the rotating shafts 21 may be disposed on the handle body 20 as a separate component. The first notch 211 can make the rotary handle 2 rotating at a limited angle during rotation (flipping).

Figure 3:
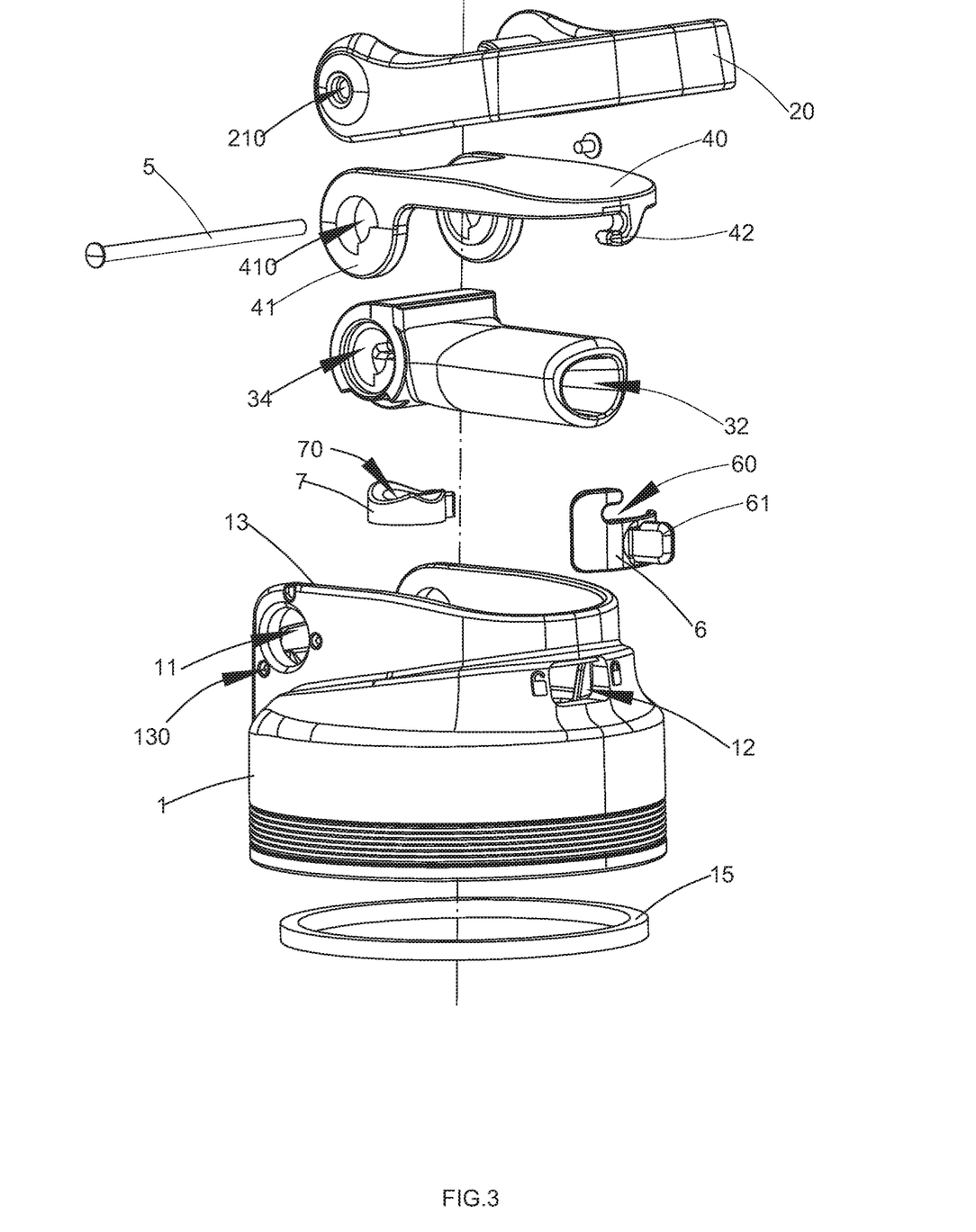
FIG. 3 is an exploded view of the rotary lid according to the embodiment of the present invention.
Figure 4:
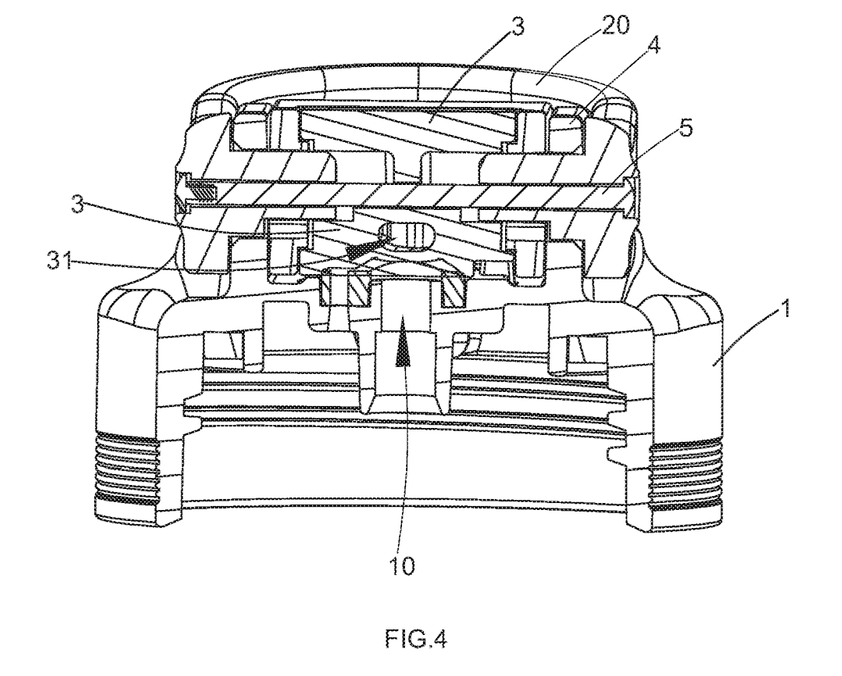
FIG. 4 is a vertical sectional view of FIG. 1.
Figure 5:
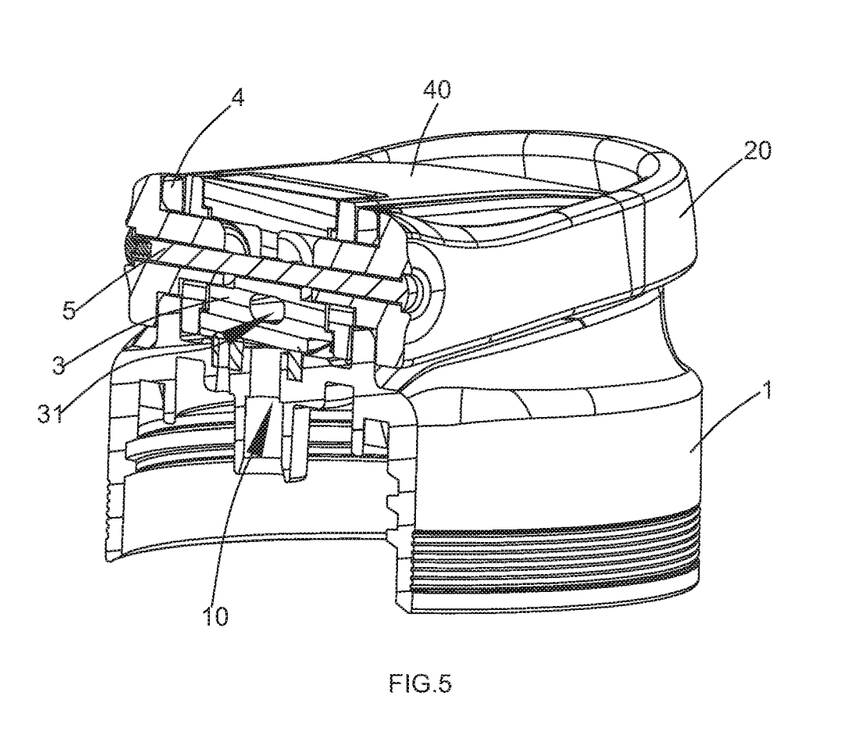
FIG. 5 is a vertical sectional view of FIG. 1 from another view.
Figure 12:
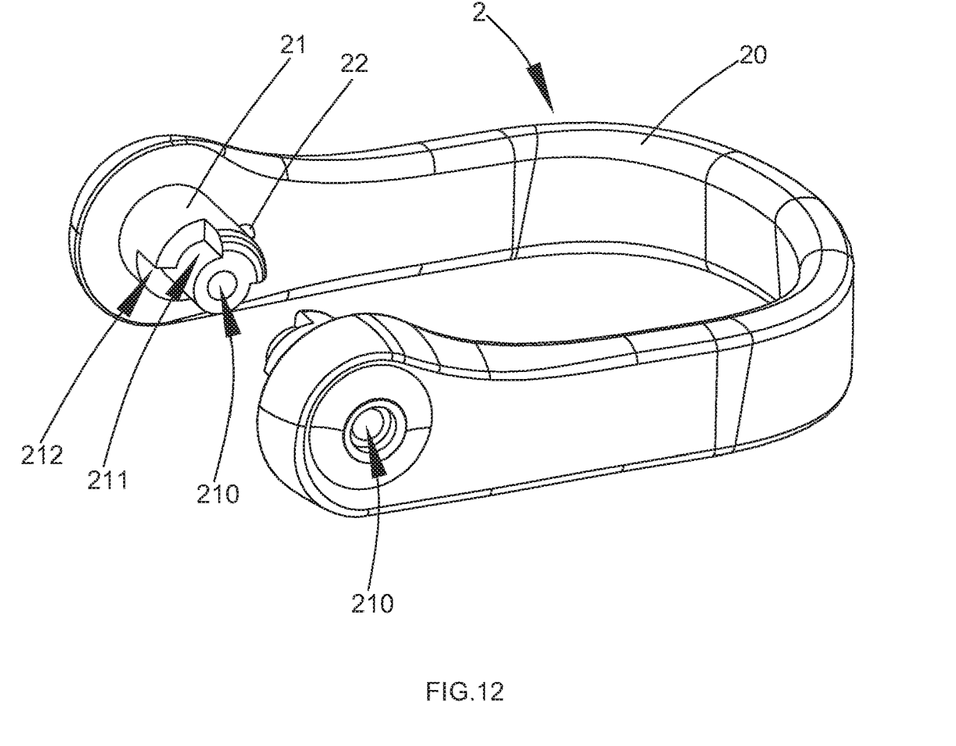
FIG. 12 is a perspective view of the rotary handle according to the embodiment of the present invention.
Figure 13:
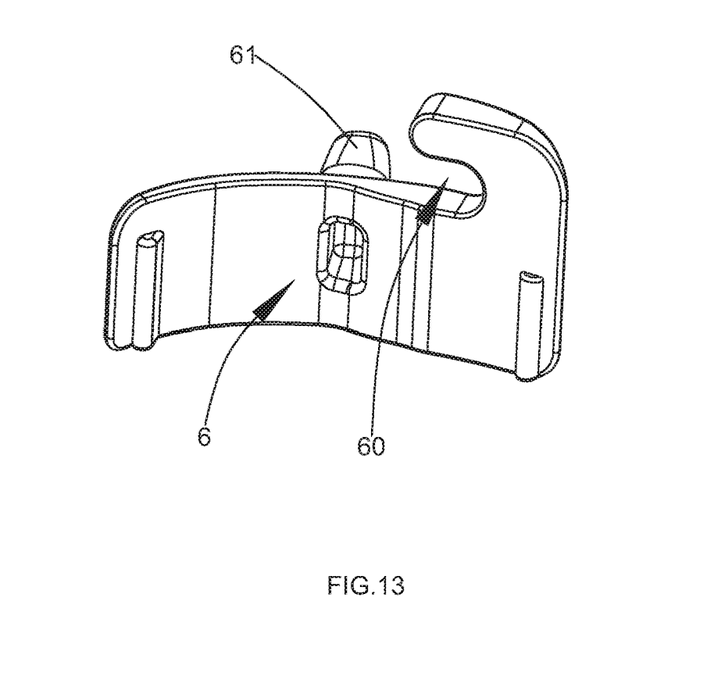
FIG. 13 is a perspective view of the toggle mechanism according to the embodiment of the present invention.

As shown in FIGS. 3 and 12, the rotating shafts 21 used here are preferably protruding directly from the handle body 20. The handle body 20 is approximately U-shaped as a whole. Each rotating shaft 21 is respectively formed at a left end and a right end of the U-shaped handle body 20. Of course, the rotating shafts 21 can also be separate components, then the rotating shafts 21 are respectively disposed on the handle body 20 in a common fastening way.

Figure 9:
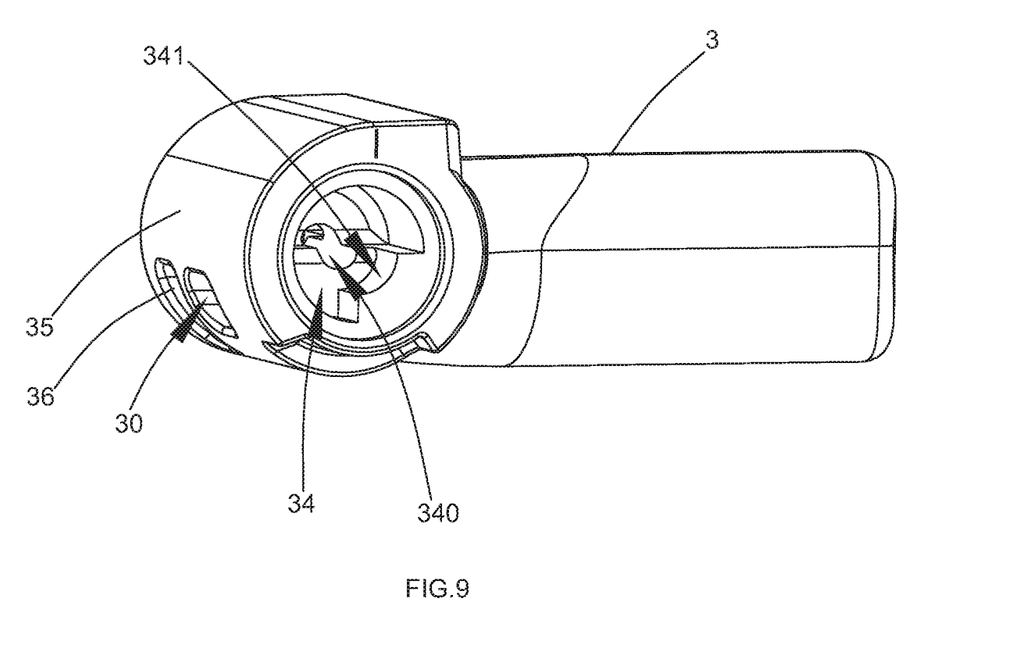
FIG. 9 is a perspective view of the suction nozzle according to the embodiment of the present invention.
Figure 10:
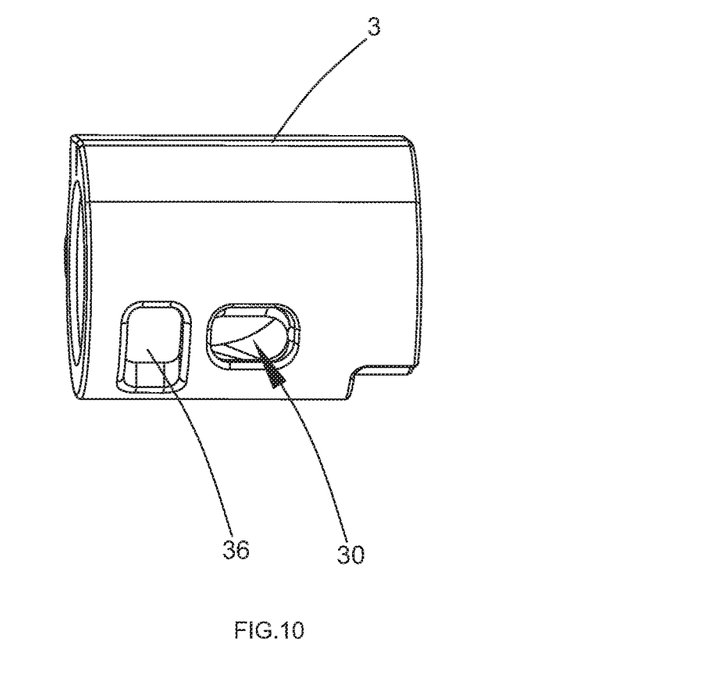
FIG. 10 is a left view of FIG. 9.

The suction nozzle 3 has a sucking water inlet 30, a water passage 31, a drinking hole 32 and a limiting slot 34 matching with the end of the rotating shafts 21, the water passage 31 is in communication with the sucking water inlet 30 and the drinking hole 32, the limiting slot 34 is located adjacent to the sucking water inlet 30 and the end of the rotating shafts 21 is inserted inside the limiting slot 34 with the first notch 211 resting against the limiting slot 34, such that rotation of the suction nozzle 3 is driven and limited by the rotary handle 2. For example, as shown in FIG. 9, a first protrusion 341 is formed on a sidewall of the limiting slot 34. The first protrusion 341 can resist against two stopping walls of the first notch 211 on the corresponding rotating shaft 21 when the rotary handle 2 rotates, so that the rotary handle 2 can drive the suction nozzle 3 to rotate and also can rotate in a limited angle range relative to the suction nozzle 3.

When the rotary handle 2 and the suction nozzle 3 are rested on the lid body, the sucking water inlet 30 is not in communication with the connecting water inlet 10 on the lid body 1; and when the suction nozzle 3 rotates up by the rotary handle 2, the sucking water inlet 30 on the suction nozzle 3 is in communication with the connecting water inlet 10 on the lid body 1. In this way, after the rotary lid is fastened onto a water container, the suction nozzle 3 will be flipped up once the user flips up the rotary handle 2 with only one hand, so that the sucking water inlet 30 is communicated with the connecting water inlet 10 on the lid body 1. Thus, the water in the cup body will flow to the lid through the connecting water inlet 10, and then to the drinking hole 32 through the sucking water inlet 30 and the water passage 31 on the suction nozzle 3. Accordingly, it is convenient for the user to drink water.

Figure 1:
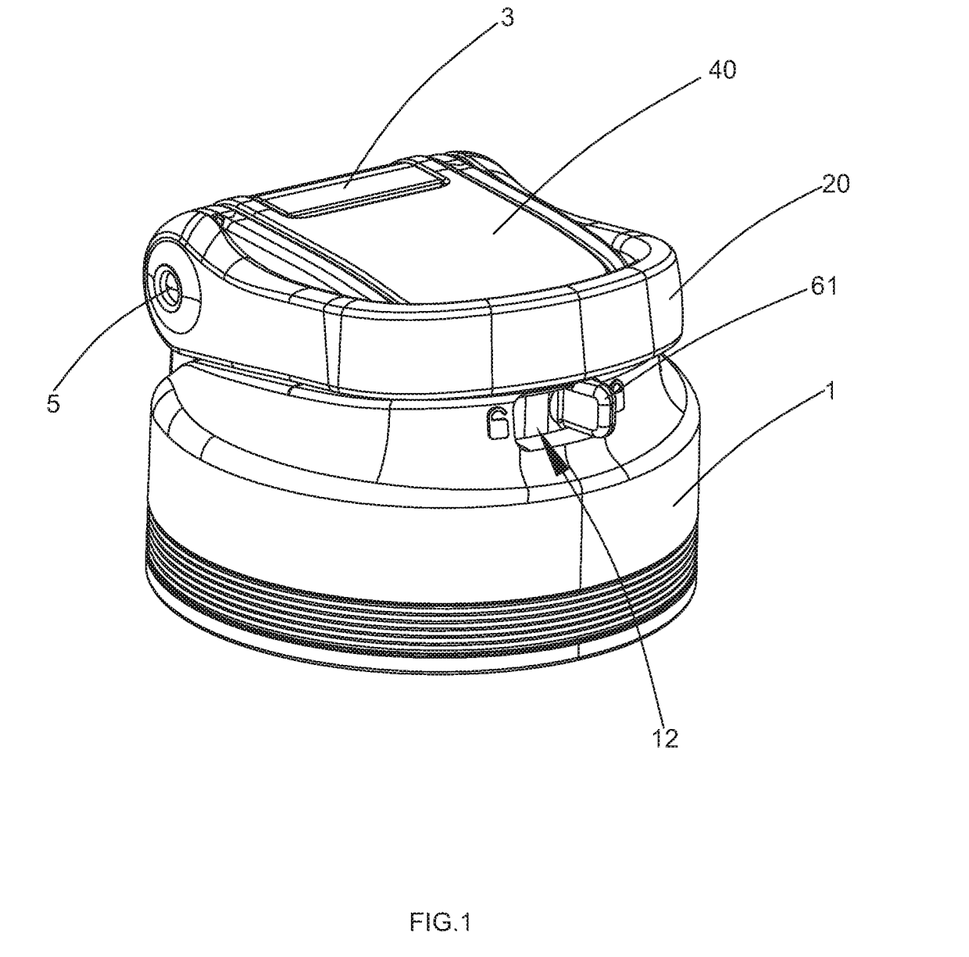
FIG. 1 is a perspective view of a rotary lid according to an embodiment of the present invention.
Figure 2:
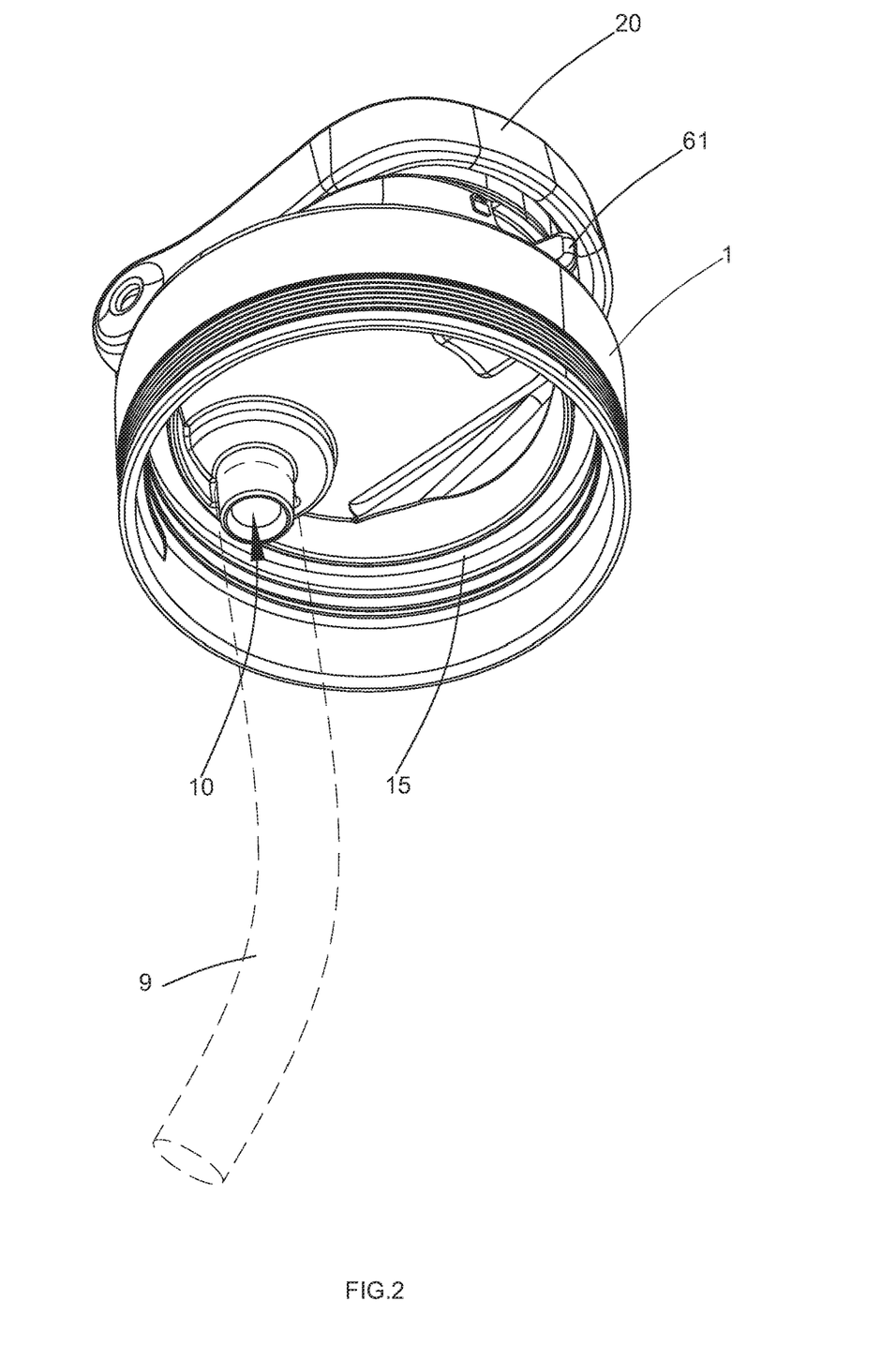
FIG. 2 is a perspective view of the bottom of the rotary lid according to the embodiment of the present invention.

To satisfy the user's actual need for safe drinking, with reference to FIGS. 1, 3 and 12, the rotary lid in this embodiment may further comprises a rotatable nozzle flip 4 for covering the suction nozzle 3, wherein the rotating shaft 21 has a second notch 212 located at the end of the rotating shaft 21, and the nozzle flip 4 has a flip body 40 and a lug 41 extending from the flip body 40, the lug 41 has a hole 410 for receiving the second notch 212. The end of the rotating shaft 21 locates inside the rotating hole 410 of the nozzle flip 4 with the second notch 212 resting against and the rotating hole 410, such that rotation of the nozzle flip 4 is driven and limited by the rotary handle 2.

Figure 11:
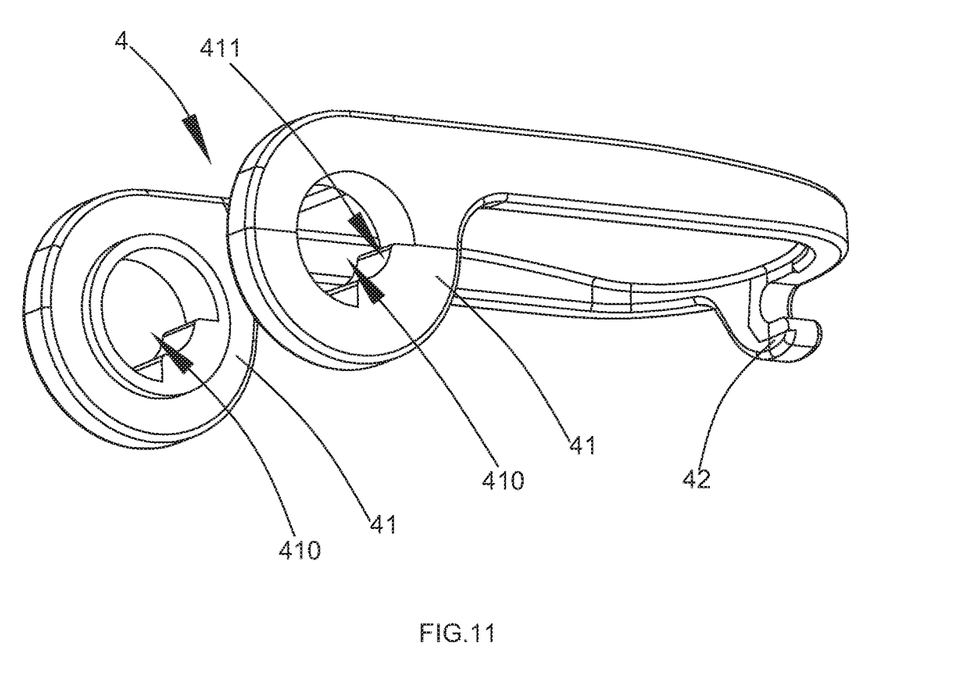
FIG. 11 is a perspective view of the nozzle flip according to the embodiment of the present invention.

To realize the rotating holes 410 respectively resting against the second notch 212 on the end of each rotating shaft 21, as shown in FIG. 11, a second protrusion 411 is formed on the sidewall of each rotating hole 410. The second protrusion 411 can resist against two stopping walls of the second notch 212 on the corresponding rotating shaft 21 when the rotary handle 2 rotates, so that the rotary handle 2 can drive the nozzle flip 4 to rotate and also can rotate in a limited angle range relative to the nozzle flip 4. If required, the radian of each second notch 212 can be greater than that of each first notch 211.

To realize the coaxial rotation of the rotary handle 2, the suction nozzle 3 and the nozzle flip 4, as shown in FIGS. 3, 4, 5 and 12, the rotating shaft 21 has a first through hole 210, the suction nozzle 3 has a second through hole 340 located inside the limiting slot 34, and a pin 5 runs through the first through hole 210, the rotating hole 410 and the second through hole 340. Such that, the rotary handle 2, the nozzle flip 4 and the suction nozzle 3 rotate around the pin 5.

In this embodiment, the nozzle flip 4 has a clamping portion 42 extending downward from the flip body 40, a toggle mechanism 6 is movably assembled on the lid body 1 at the front of the drinking hole 32 on the suction nozzle 3, having a toggle stick 61 protruding at a front surface of the toggle mechanism 6 which when pushed causes the toggle mechanism 6 to move relative to the lid body 1. The lid body 1 has a toggle hole 12, the toggle stick 61 extents from the inside of the lid body 1 to the outside of the lid body 1 through the toggle hole 12; and, the toggle mechanism 6 engages the clamping portion 42 when the toggle stick 61 is pushed. The structure of the nozzle flip 4 refers to FIGS. 3 and 11, the arrangement of the toggle hole 12 refers to FIGS. 6, 7 and 8, and the structure of the toggle mechanism 6 refers to FIG. 13. The whole toggle mechanism 6 can be arch, and the main part of the toggle mechanism 6 can exactly cover the drinking hole 32 on the suction nozzle 3. The toggle mechanism 6 has a clamping port 60 for allowing the clamping portion 42 to be clamped into.

Figure 6:
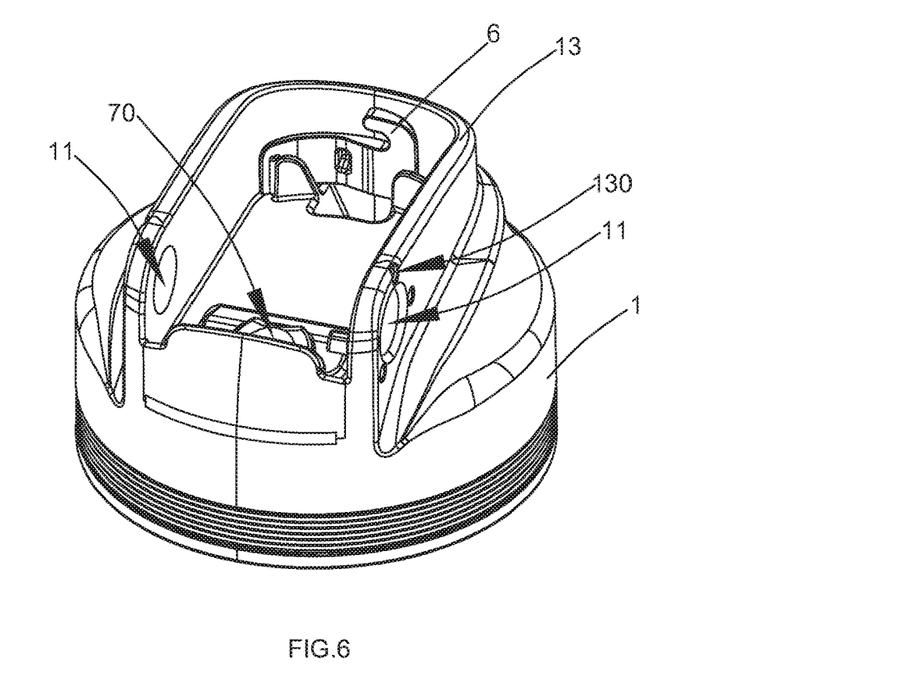
FIG. 6 is a perspective view of FIG. 1 when a rotary handle, a suction nozzle and a nozzle flip are removed.
Figure 7:
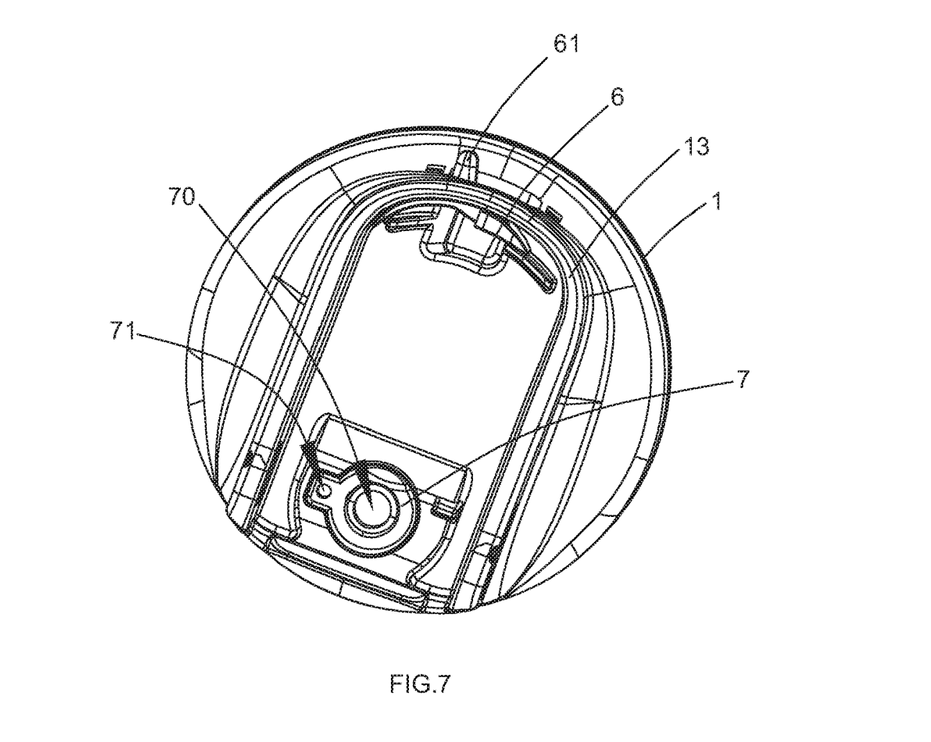
FIG. 7 is a top view of FIG. 6.
Figure 8:
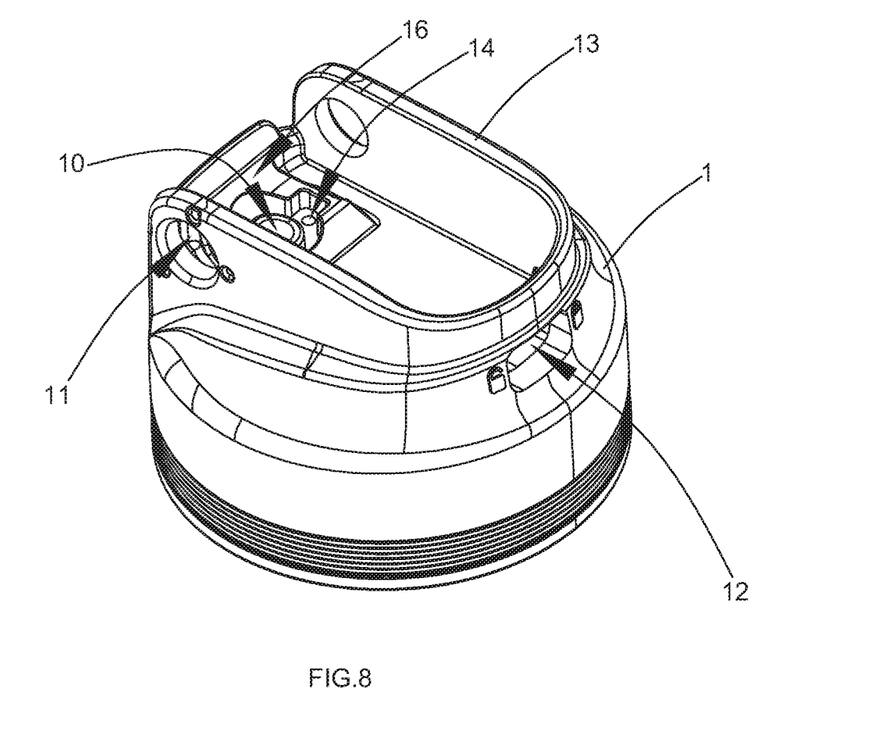
FIG. 8 is a perspective view of FIG. 6 after a toggle mechanism is removed.

To ensure that the rotary handle 2 can more stably rotate about the shaft hole 11 on the lid body 1, with reference to FIGS. 6 and 8, the lid body 1 further has a connecting wall 13 protruding from a top edge of the lid body 1 around the connecting water inlet 10, and the shaft hole 11 is formed on the connecting wall 13. Here, the connecting wall 13 is preferably formed on the lid body 1 in such a manner that it surrounds the edge of the lid body 1.

To position the rotary handle 2 when the lid body 1 is rotated to a different position, with reference to FIGS. 6 and 12, the lid body 1 has a plurality of positioning recesses 130 formed on the connecting wall 13, and the rotary handle 2 has a plurality of positioning points 22 on the rotating shaft 21, each positioning point 22 is located in the corresponding positioning recess 130. In this way, after the rotary handle 2 is flipped up and rotated to a certain position, the positioning point 22 on the rotary handle 2 will be clamped into the positioning recess 130 on the connecting wall 13. This clamping process will give the user a clamping effect prompt which is mainly a vibration prompt during clamping. Of course, according to actual needs, the number of the positioning recess 130 and the number of the positioning point 22 fitted with the positioning recess 130 may be increased or decreased properly. The positions of adjacent positioning recess 130 may also be determined as required. Correspondingly, the positions of adjacent positioning point 22 on the rotary handle 2 are also adjusted adaptively to fit with the positioning recess 130 formed on the connecting wall 13.

In practical applications of the rotary lid, to avoid leakage of water from the connecting water inlet 10, a seal component 7 for fitting with the connecting water inlet 10 is provided on the upper end face of the lid body 1, an opening 70 for communicating the connecting water inlet 10 is formed on the seal component 7, and the seal component 7 is located between the suction nozzle 3 and the connecting water inlet 10. The arrangement of the seal component 7 may refer to FIGS. 6 and 7. An air inlet 14 may also be formed on the lid body 1, to ensure the air pressure balance in the cup body after the rotary lid is fitted with the cup body, so that the water contained in the cup body more smoothly flows into the suction nozzle 3 through the connecting water inlet 10. An air inlet connection hole 71 for communicating the air inlet 14 may also be formed on the seal component 7. An air inlet seal structure 36 is formed on the suction nozzle 3. The air inlet seal structure 36 can block the air inlet connection hole 71 when the suction nozzle 3 is not flipped up, and can unblock the air inlet connection hole 71 when the suction nozzle 3 is flipped up.

A leak-proof seal ring 15 may also be formed on an inner side of the lid body 1. In this way, the sealing and leak-proof effect can be ensured when the cup body containing water is fastened with the rotary lid.

Here, a threaded structure fitted with an external cup body may be provided on an inner sidewall of the lid body 1, to satisfy the drinking need after the rotary lid is fitted with the external cup body.

In addition, in this embodiment, the portion 35 of the suction nozzle 3 located at the sucking water inlet 30 is arc-shaped, and the lid body 1 has an arc-shaped section 16 for cooperating with the arc-shaped portion 35. Thus, the smoothness of the rotation of the suction nozzle 3 relative to the lid body 1 can be ensured.

Figure 14:
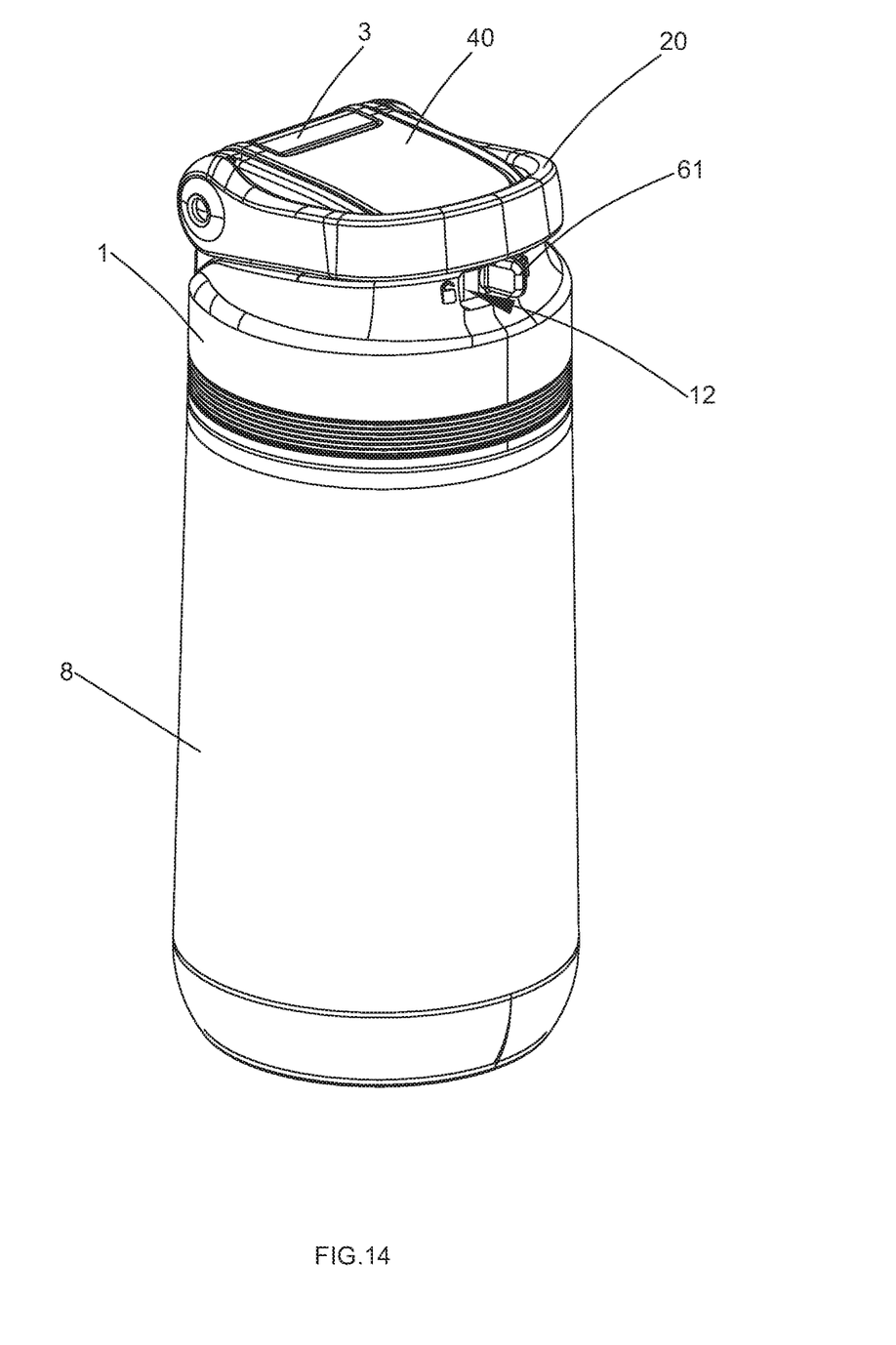
FIG. 14 is a perspective view of a drinking cup according to an embodiment of the present invention.

FIG. 14 shows a drinking cup with the rotary lid of the present invention. The drinking cup comprises a cup body 8 and the rotary lid. The lid body 1 of the rotary lid is screwed on the cup body 8.

Of course, to satisfy the user's drinking need, a drinking pipe 9 (represented by the dashed line) may be additionally provided. One end of the drinking pipe 9 is connected to the connecting water inlet 10 on the lid body, and the other end of the drinking pipe 9 is located inside the cup body 8.

When the user wants to have a drink, the user pushes the toggle stick 61 on the outer side of the lid body 1, so that the toggle mechanism 6 is pushed to move away from the clamping portion 42 of the nozzle flip 4. When the use drive the rotary handle 2 to rotate up, and the toggle mechanism 6 does not cover the drinking hole 32 on the suction nozzle 3, the nozzle flip 4 will be firstly be driven to rotate and be turned up and the suction nozzle 3 will not rotate, then the rotary handle 2 continues to be driven to rotate and be turned down, the suction nozzle 3 and the nozzle flip 4 will be driven to rotate and be turned up together with the rotation of the rotary handle 2, so that the drinking hole 32 on the suction nozzle 3 is flipped up for drinking, and the sucking water inlet 30 on the suction nozzle 3 is communicated with the connecting water inlet 10 on the lid body 1. When the user drinks water through the drinking hole 32, the water in the cup body 8 can flow to the connecting water inlet 10 through the drinking pipe 9 and then out of the drinking hole 32 through the sucking water inlet 30 and the water passage 31 on the suction nozzle 3.

When the user does not want to have a drink, the rotary handle 2 is rotated to close, to returning its original position, the suction nozzle 3 and the nozzle flip 4 will be driven to rotate and be turned down. The clamping portion 42 of the nozzle flip 4 is clamped with the toggle mechanism 6 again, and the rotary handle 2, the suction nozzle 3 and the nozzle flip 4 are not turned up. At this time, the sucking water inlet 30 on the suction nozzle 3 is not communicated with the connecting water inlet 10 on the lid body 1. Then, the drinking hole 32 on the suction nozzle 3 can be covered by the toggle mechanism 6 again, to avoid impurities such as dust from polluting the drinking hole 32.

What is claimed is:

1. A rotary lid for a water container, comprising:
   a lid body having a connecting water inlet and a shaft hole;
   a rotary handle rotatably connected to the lid body; and
   a suction nozzle rotatably connected to the rotary handle;
   wherein, the rotary handle has a handle body and a rotating shaft with an end protruding from an inner wall of the handle body, the rotating shaft is inserted inside the shaft hole on the lid body, the rotary handle is disposed on the lid body rotating around the rotating shaft; and the rotating shaft has a first notch located at an end of the rotating shaft;
   the suction nozzle has a sucking water inlet, a water passage, a drinking hole and a limiting slot matching with the end of the rotating shaft, the water passage is in communication with the sucking water inlet and the drinking hole, the limiting slot is located adjacent to the sucking water inlet and the end of the rotating shaft is inserted inside the limiting slot with the first notch resting against the limiting slot, such that rotation of the suction nozzle is driven and limited by the rotary handle;
   when the rotary handle and the suction nozzle are rested on the lid body, the sucking water inlet is not in communication with the connecting water inlet on the lid body; and when the suction nozzle rotates up by the rotary handle, the sucking water inlet on the suction nozzle is in communication with the connecting water inlet on the lid body.

2. The rotary lid of claim 1, further comprising a rotatable nozzle flip for covering the suction nozzle;
   wherein the rotating shaft has a second notch located at the end of the rotating shaft; and
   the nozzle flip has a flip body and a lug extending from the flip body, the lug has a hole for receiving the second notch;
   the end of the rotating shaft locates inside the rotating hole of the nozzle flip with the second notch resting against and the rotating hole, such that rotation of the nozzle flip is driven and limited by the rotary handle.

3. The rotary lid of claim 2, wherein the rotating shaft has a first through hole, the suction nozzle has a second through hole located inside the limiting slot, and a pin runs through the first through hole, the rotating hole and the second through hole, such that, the rotary handle, the nozzle flip and the suction nozzle rotate around the pin.

4. The rotary lid of claim 2, wherein the nozzle flip has a clamping portion extending downward from the flip body;
   a toggle mechanism is movably assembled on the lid body at the front of the drinking hole on the suction nozzle, having a toggle stick protruding at a front surface of the toggle mechanism which when pushed causes the toggle mechanism to move relative to the lid body;
   the lid body has a toggle hole, the toggle stick extents from the inside of the lid body to the outside of the lid body through the toggle hole; and, the toggle mechanism engages the clamping portion when the toggle stick is pushed.

5. The rotary lid of claim 2, wherein the lid body has a connecting wall protruding from a top edge of the lid body around the connecting water inlet, and the shaft hole is formed on the connecting wall.

6. The rotary lid of claim 5, wherein the lid body has a plurality of positioning recesses formed on the connecting wall, and the rotary handle has a plurality of positioning points on the rotating shaft, each positioning point is located in the corresponding positioning recess.

7. The rotary lid of claim 2, wherein a seal component for fitting with the connecting water inlet is provided on the upper end face of the lid body, an opening for communicating the connecting water inlet is formed on the seal component, and the seal component is located between the suction nozzle and the connecting water inlet.

8. The rotary lid of claim 2, wherein the radian of the second notches is greater than that of the first notches; or, an air inlet is formed on the lid body; or, a leak-proof seal ring is formed on an inner side of the lid body.

9. A drinking cup, comprising a cup body and a rotary lid of claim 1, wherein the lid body of the coaxial rotary lid is screwed on the cup body.

10. The drinking cup of claim 9, wherein the drinking cup further comprises a drinking pipe with two ends, one end of the drinking pipe is connected to the connecting water inlet on the lid body, and the other end of the drinking pipe is located inside the cup body.

* * * * *